Jan. 23, 1968  R. L. JEANSON  3,364,907
ROTARY PISTON MECHANISM
Filed April 27, 1965  5 Sheets-Sheet 1
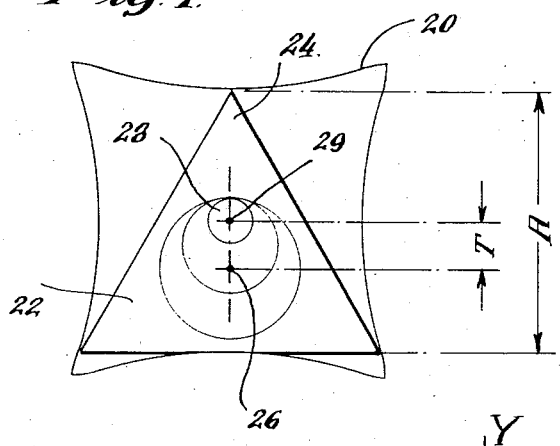
Fig. 1.
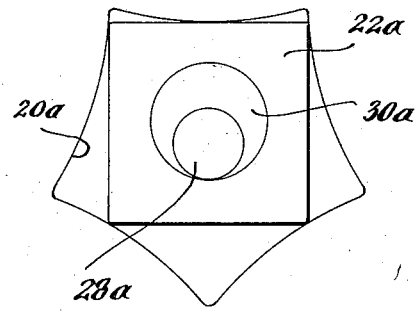
Fig. 1b.
Fig. 1a.
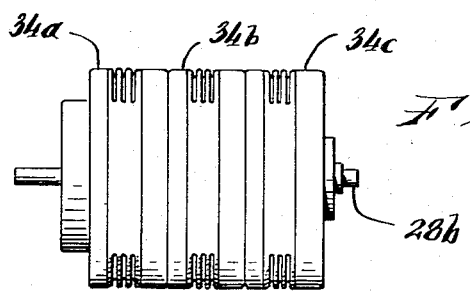
Fig. 16.
INVENTOR.
Richard L. Jeanson Jan. 23, 1968  R. L. JEANSON  3,364,907
ROTARY PISTON MECHANISM
Filed April 27, 1965  5 Sheets-Sheet 2

INVENTOR.
Richard L. Jeanson

Jan. 23, 1968 R. L. JEANSON 3,364,907
ROTARY PISTON MECHANISM
Filed April 27, 1965 5 Sheets-Sheet 3
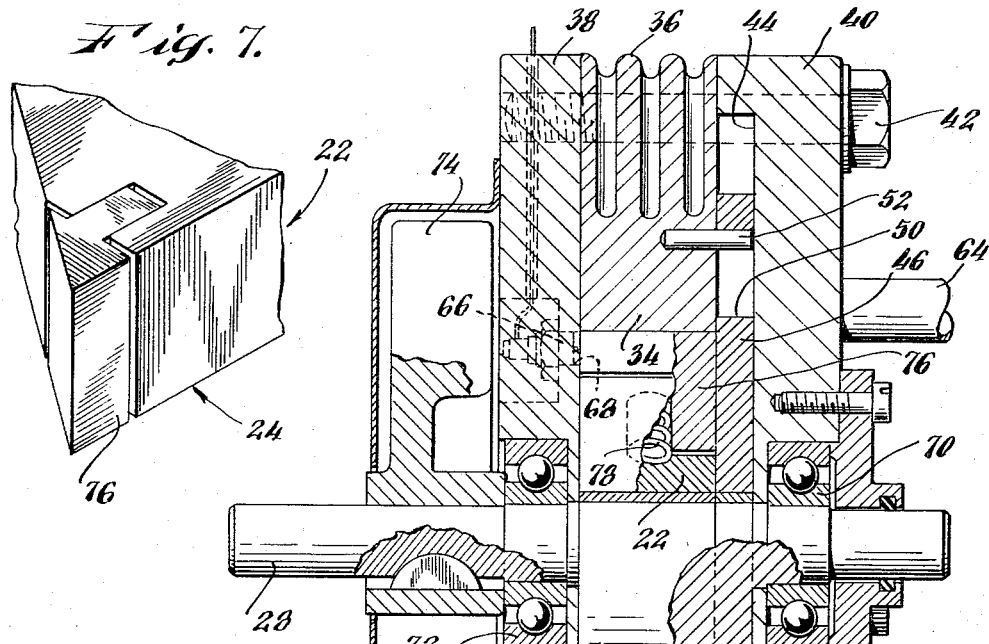
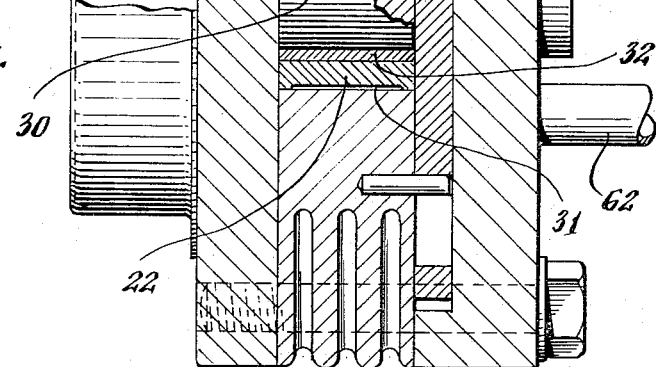
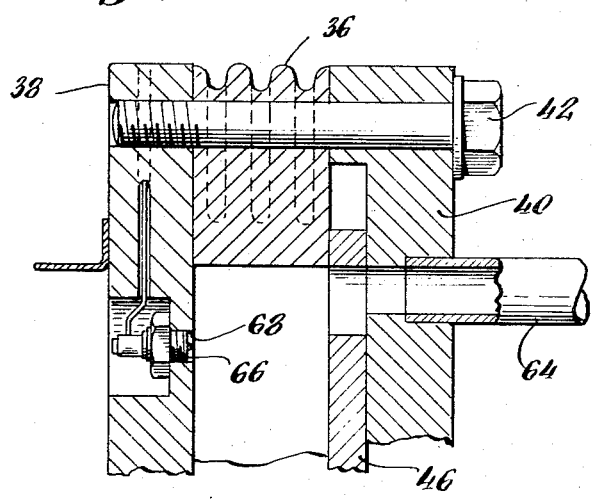
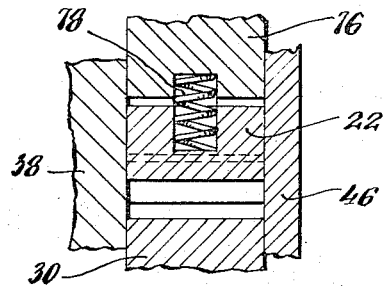
INVENTOR.
Richard L. Jeanson Jan. 23, 1968 R. L. JEANSON 3,364,907
ROTARY PISTON MECHANISM
Filed April 27, 1965 5 Sheets-Sheet 4

INVENTOR.
Richard L. Jeanson

Jan. 23, 1968 — R. L. JEANSON — 3,364,907

ROTARY PISTON MECHANISM

Filed April 27, 1965 — 5 Sheets-Sheet 5

INVENTOR.
Richard L. Jeanson

United States Patent Office 3,364,907
Patented Jan. 23, 1968

3,364,907
ROTARY PISTON MECHANISM
Richard L. Jeanson, Watertown, Wis., assignor of one-eighth to Ronald J. St. Onge, Stamford, Conn.
Filed Apr. 27, 1965, Ser. No. 451,245
14 Claims. (Cl. 123—8)

ABSTRACT OF THE DISCLOSURE

The disclosure is of a rotary piston mechanism having a chamber in the shape of an astroid within which is eccentrically rotated a piston in the shape of a regular polygon. As a rotary piston engine, the astroid is four sided and the piston is an equilateral triangle. Inlet and exhaust valves are alternately positioned in the astroid peaks and are operated by cam means on the engine drive shaft in timed relation to the piston movement.

---

This invention relates to rotary piston mechanisms and more particularly to such a mechanism for internal combustion engines, pumps, fluid motors and the like wherein an outer body surrounds an inner body or piston which rotates relative to the outer body. The piston rotates and moves eccentrically with relation to the outer body to form successive working chambers between it and the outer body.

In general rotary piston internal combustion engines, pumps and fluid motors operating on these general principles are known. Such a machine is disclosed in U.S. Patent No. 2,988,008 in which the outer body is in the form of an epitrochoid with an inner body in the form of a hypotrochoid. An internal combustion engine utilizing these principles is disclosed in U.S. Patents 2,947,290 and 2,988,065.

These prior art rotary piston machines and engines have certain limitations however, such as low compression ratios and slow rate of volume change in the working chambers when used as an intenal combustion engine. The foregoing conditions limit such a rotary machine to high speed, low torque output in applications as a rotary engine. For these reasons such prior art rotary engines have been used as a means for generating a gas to drive a turbine rather than to be coupled to a direct drive. Further, these prior art internal combustion engines have only one four-cycle operation per 360 degrees rotation of the piston and consequently will not generate power as smoothly or with enough torque for direct drive applications.

Many prior art rotary internal combustion engines have required a large number of gears and pinions, for instance as disclosed in U.S. Patent No. 3,074,387.

Accodingly, it is an object of this invention to provide a rotary mechanism having working spaces formed between hypotrochoidal outer body and a piston in the shape of a regular polygon.

Another object of the invention is to provide a rotary piston mechanism of the above character wherein the outer body is substantially an astroid.

A further object of the invention is to provide rotary piston mechanisms of the above character wherein the rotor or piston is substantially an equilateral triangle.

Another object of the invention is to provide rotary piston mechanisms of the above character which may be used for internal combustion engines.

A further object of the invention is to provide rotary piston mechanisms of the above character which have substantial compression ratios and torque output when employed as an internal combustion engine.

Another object of the invention is to provide rotary piston mechanisms of the above character which have more than one four-cycle operation per 360 degrees rotation when used as an internal combustion engine.

A further object of the invention is to provide rotary piston mechanisms of the above character which are inexpensive to manufacture and durable in operation.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic end view of the outline shape of the inner and outer body of my rotary mechanism illustrating their relationship to each other.

FIGURE 1a is a schematic illustration of the generation of a special astroid for my rotary mechanism.

FIGURE 1b is a schematic view of another embodiment of my rotary mechanism.

FIGURE 4 is a side sectional view taken along lines 4—4 of FIGURE 2.

FIGURE 5 is an enlarged partial sectional view taken along lines 5—5 of FIGURE 2.

FIGURE 6 is a partial sectional view taken along lines 6—6 of FIGURE 3.

FIGURE 7 is a partial perspective view of a corner of the rotor.

FIGURE 16 is a side view of three such rotary mechanisms joined together to drive a single shaft.

Figure 2:
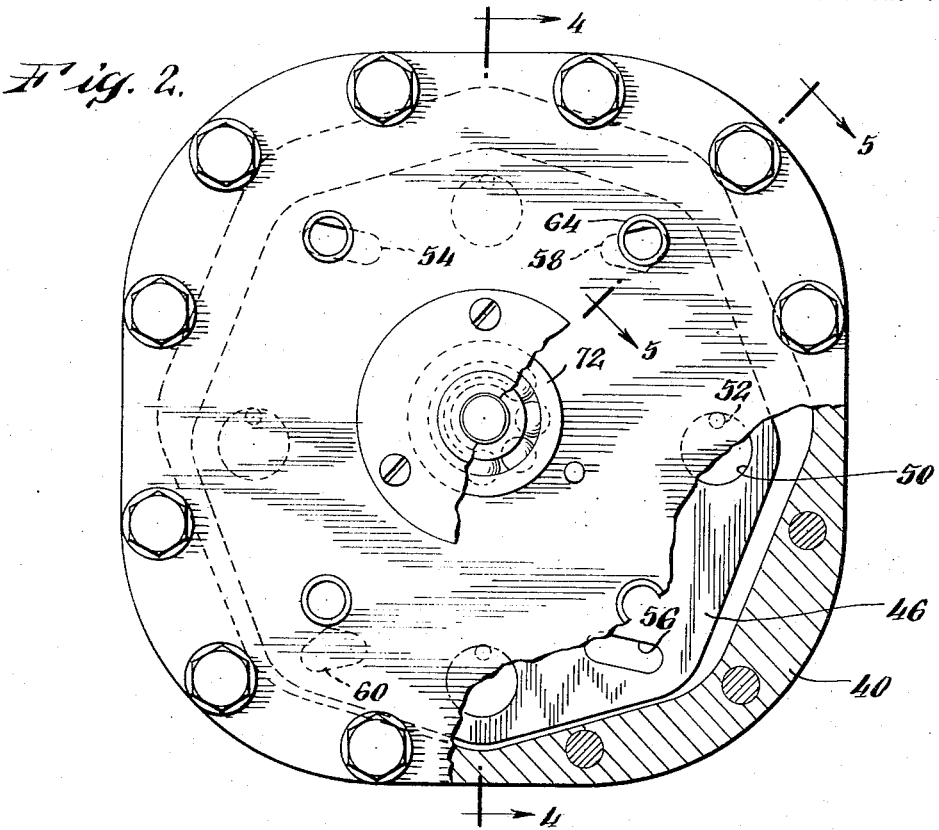
FIGURE 2 is an end view, partially broken away, to show the relationship of the rotary mechanism as an internal combustion engine.

Referring now to FIGURE 1, the invention will be generally described. The outer body of my rotary mechanism has an inner surface 20 in the shape of an astroid and a rotor 22 in the shape of a regular polygon. The astroid preferably has four "sides" and the polygonal rotor is preferably an equilateral triangle. As will be more fully explained hereafter the triangular rotor 22 is closely fitted within the astroidal outer body and rotates eccentrically on circular cam 30 which is secured to power shaft 28 to "walk around" inside the outer body and form the working chambers of the engine or pump. As the triangular rotor rotates about the center 26, the points of the triangular rotor, such as point 24, closely follow the astroidal outline described by the interior of the outer body.

The inner surface 20a of the outer body may be five "sided" with a square rotor 22a as shown in FIGURE 1b. Thus, circular cam 30a is similarly secured to power shaft 28a and as square rotor 22a "walks" around the line 20a, cam 30a rotates power shaft 28a.

The relationship of the astroidal outer body and triangular rotor is determined as follows. In general an astroid may be generated by a point on the circumference of a smaller circle which is rolled around the circumference of a large circle, the line being traced by the point on the smaller circle to outline the astroid. The diameter of the smaller circle may be three quarters the diameter of the larger circle. The astroidal shape of the inner surface 20 of the outer body of the present invention, however, in order to contain the eccentric rotary motion of an equilateral triangle, is generated as follows.

Referring now to FIGURE 1a with a given altitude for the triangular rotor, the smaller circle $Cs$ for generating the astroidal shape of the outer body chamber has a diameter $Ds$ equal to the altitude of the triangular rotor. The smaller circle is three quarters the diameter $Dl$ of the larger circle $Cl$.

However, instead of placing the point P of generation on the circumference of the smaller circle, point P is placed outside the smaller circle at a distance from the smaller circle center equal to two thirds its diameter. As the smaller circle is rotated around the circumference of the larger circle, the generating point P describes an astroid, the peaks of which all lie outside the large circle. The altitude E of the peaked portions of the astroid are equal to the radius of eccentricity (throw) of the triangular rotor.

As an illustrative example, the diameter $Dl$ of the larger circle may be 4 inches; the diameter $Ds$ of the smaller circle (and the altitude of the triangular rotor) will be 3 inches, with the point P of generation being fixed at 2 inches from the center of the smaller circle. An eccentric throw equal to the altitude of the astroid peaks E (one-half inch) permits rotation of the triangular rotor tips within the astroidal outer body chamber 20, with the rotor tips closely following the astroidal shape of the chamber. The throw T, as shown in FIGURE 1, is the distance between the center 26 of the rotor and the power shaft center 29, about which center 26 rotates.

Referring to FIGURE 1a, the angle $a$ represents the angular movement of the "crank" (between the triangular rotor center 26 and power shaft center 29). The angel $b$ represents the angular movement of a line from the triangular rotor center 26 to a peak of the rotor. The relationship of the angles $a$ and $b$ is: $b = 90 - (a/3)$, and when plotted on X–Y axes:

$X = 2 \cos b - \frac{1}{2} \sin a$
$Y = 2 \sin b + \frac{1}{2} \cos a$

As the rotor walks around the inner surface of the outer body, successive working chambers are formed between the rotor and the inner surfaces of the outer body which have high compression ratios for such a rotary mechanism. Inlet and exhaust ports to and from these working chambers may be formed in an end wall or walls of the outer body for the admission, compression and exahusting of fluids from these working chambers. A sliding valve plate may be interposed between an end of the rotor and an end wall of the outer body. Such a valve plate may be eccentrically driven by the same power shaft upon which the rotor is eccentrically journaled.

Thus the rotary mechanism of my invention may be readily used as a pump or a compressor, or by providing ignition means for the proper working chambers, my rotary mechanism may be used in an internal combustion engine.

Figure 3:
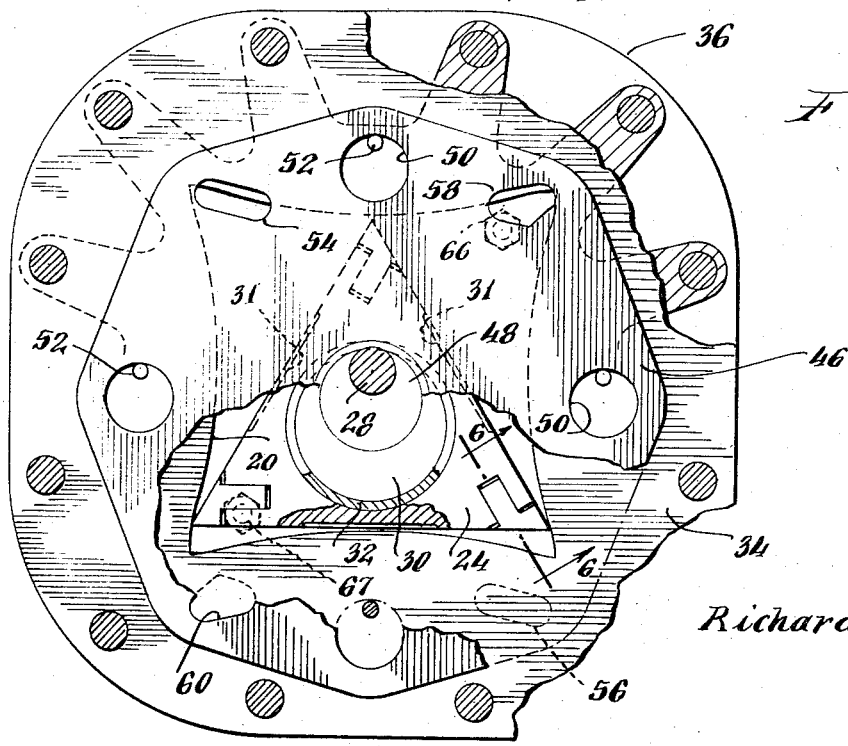
FIGURE 3 is an end view having an end wall removed and partially broken away.

Referring now to FIGURES 2–4, my rotary internal combustion engine embodiment will be described in more detail. As best seen in FIGURES 3 and 4, the power shaft 28 is driven by an eccentrically mounted circular cam 30 upon which the triangular rotor 24 is rotatably mounted. The cam 30 thus rotates relative to the rotor 24 on bearing sleeve 32. The outer body 34 has a central cut-out portion 20 in the shape of an astroid as described above. Cooling fins 36 may be formed on the exterior of the outer body or the outer body may be jacketed for liquid cooling.

End plates 38, 40 are secured at the ends of outer body 34 by bolts 42 to form the outer body enclosure. End plate 40 is provided with cut-out portion 44 (FIG. 4) for accommodating a sliding valve plate 46 which is journaled on eccentric cam 48. Eccentric cam 48 is secured to the power shaft 28 and has a shorter eccentric throw than eccentric cam 30. As shown in FIGURE 3, four guide holes 50 are formed in the valve plate 46 near its periphery with guide pins 52 being secured in the outer body portion 36 to stabilize the valve plate as it moves with its eccentric motion about power shaft 28.

As best seen in FIGURE 3, inlet ports 54, 56 and exhaust ports 58, 60 are formed in the valve plate 46. These inlet and exhaust ports communicate with inlet and exhaust manifold connections such as 62, 64 as the sliding valve plate 46 is eccentrically rotated in synchronism with the rotor 22. Ignition means such as glow plugs 66, 67 are positioned in end wall 38 to permit passage of the rotor thereover and explode the compressed fuel and air mixture as the glow plug is uncovered by rotor movement. As shown in FIGURE 4 glow plug 66, for example, is positioned in recess 68 and in end wall 38.

Figure 8:
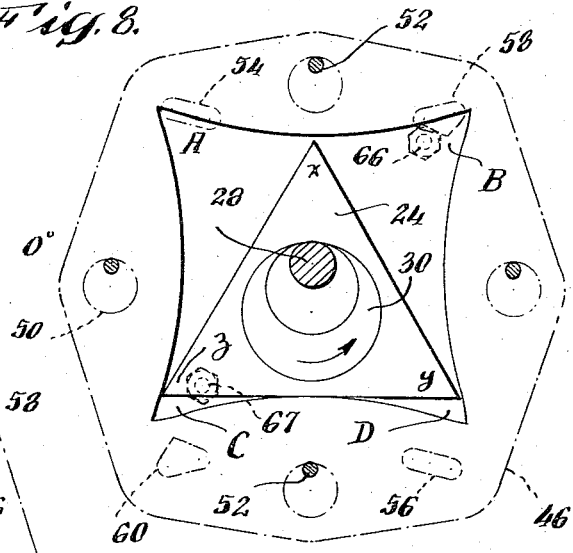
FIGURES 8–15 are schematic end views showing the successive relationships of the rotor to the outer body and of the valve plate during 360° of rotation of the rotor.

As shown in FIGURES 3 and 4, shallow grooves 31 may be formed in each rotor side to enhance transfer of the fuel-air mixture from a compression to a power chamber, such as from chamber D to chamber C in FIGURE 8.

The power shaft 28 may be journaled in ball bearings 70, 72. For some applications a flywheel 74 may be driven by shaft 28. To achieve optimum smoothness of performance, however, a plurality of engine units having outer bodies 34a, 34b and 34c are banked together with counter balanced rotors driving a common shaft 28b, as shown in FIGURE 16.

As shown in FIGURES 6 and 7, the rotor tips 24 may be provided with sealing ends 76 which are urged by a spring 78 against the astroidal inner surface 20 of the outer body as the rotor rotates. In some applications such spring pressed sealing ends may not be necessary because of the rapid compression in the working chambers.

*Operation*

Referring now to FIGURES 8–14, the operation of my rotary piston combustion engine will be described. As shown in FIGURE 8, the triangular rotor 22 is vertically positioned to form large working chambers A and B and small working chambers C and D between the rotor and the interior of the outer body. The rotor rotates in a clockwise direction and drives cam 30 in a counterclockwise direction. Eccentric cams 30 and 48 are secured to power shaft 28 and rotate with shaft 28 in a counterclockwise direction and at the same angular speed.

As stated above, the openings 54, 56 are intake ports and openings 58 and 60 are exhaust ports in the valve plate 46. As shown in FIGURE 8, exhaust port 58 is open to chamber B and inlet port 54 is open to chamber A to permit fuel and air to enter chamber A until that chamber reaches its maximum volume. Thus as point X of the rotor moves to the right as seen in FIGURE 8, burned gases will be exhausted through port 58 and fuel and air drawn in through port 54. At this point fuel and air have been compressed in chamber D and will be exploded in chamber C as the rotor point Y forces the fuel air mixture to chamber C and the ignition glow plug 67 is uncovered.

Figure 9:
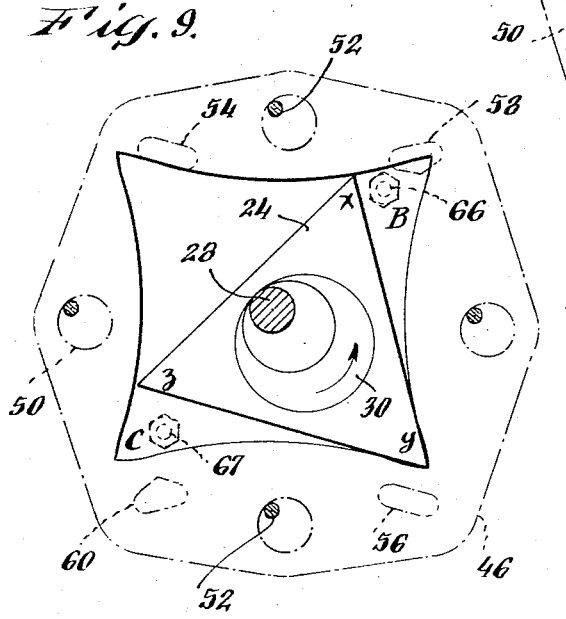

As shown in FIGURE 9, point X of the triangular rotor has just passed the point of maximum volume in the working chamber A, and the inlet port 54 has accordingly closed. Exhaust port 58, however, remains open as the exhaust gases are expelled from changer B. As glow plug 67 is uncovered by the movement of rotor point Z the fuel-air mixture in chamber C has been exploded to drive the rotor point Z upwardly.

Figure 10:
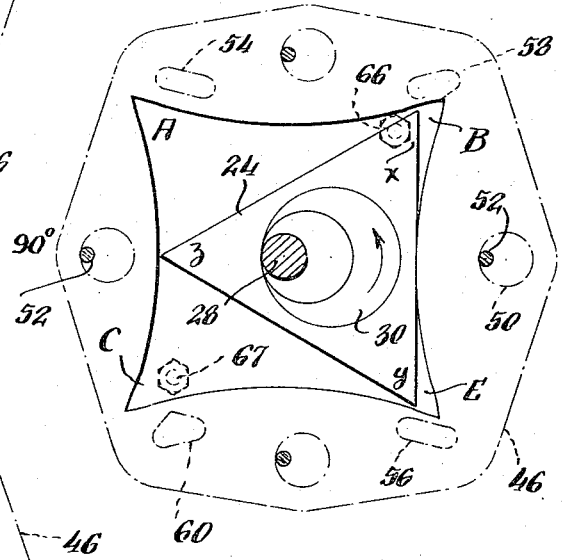

In FIGURE 10 point X of the triangular rotor has moved toward the end of its substantially lateral motion to greatly reduce the volume of chamber B and exhaust port 58 is rapidly closing as exhaust gases have been forced from chamber B. Compression of fuel and air simultaneously takes place in chamber A as point Z of the triangular rotor moves upwardly. Power is still being produced in chamber C by the exploded, expanding gases and new chamber E is now being formed adjacent inlet 56.

Figure 11:
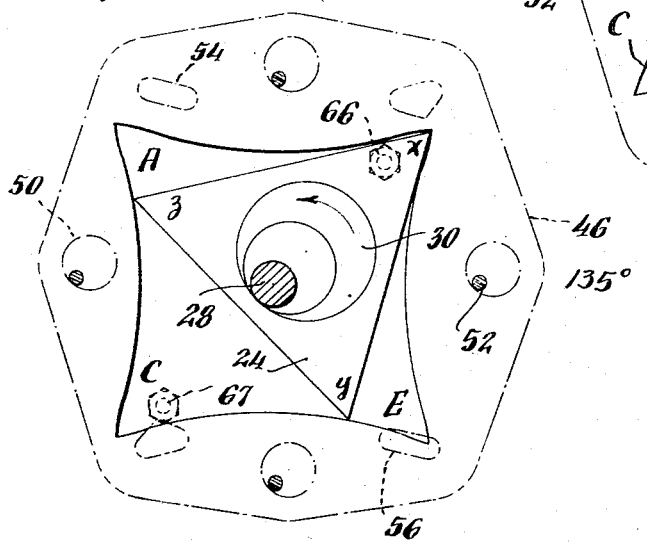

As shown in FIGURE 11, the chamber B has been eliminated and the fuel-air mixture in chamber A is nearing maximum compression by further movement of the rotor. As the rotor tip Y moves substantially transversely, the inlet 56 is opened, permitting a fuel and air mixture to be drawn into expanding new chamber E. Chamber C at this point is at maximum volume and the exhaust port 60 is opened to begin the exhaust of gases from chamber C.

Figure 12:
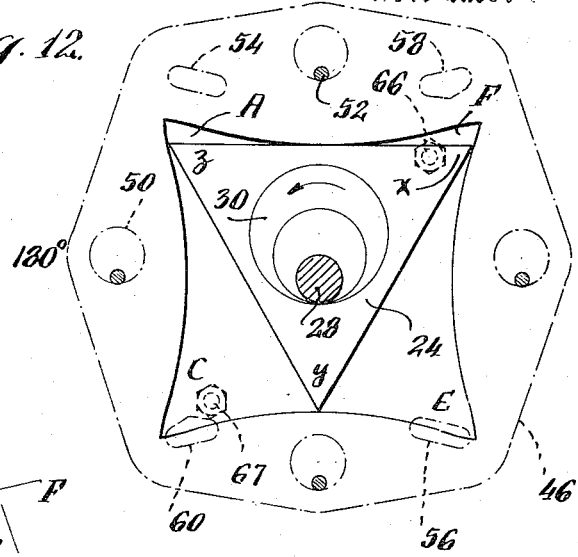

Referring now to FIGURE 12, it will be seen that the fuel-air mixture in chamber A is near maximum compression and that fuel and air continues to be drawn into chamber E while exhaust gases are expelled from chamber C and new chamber F is being formed adjacent glow plug 66.

Figure 13:
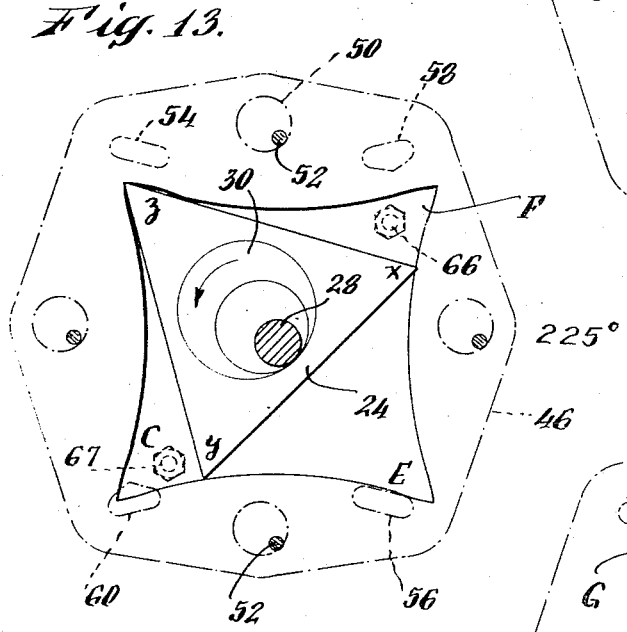

As shown in FIGURE 13, the glow plug 66 has been uncovered by movement of rotor tip X to explode the fuel-air mixture in chamber F and drive rotor tip X downwardly. Chamber A has been eliminated, with the fuel-air mixture in that chamber having been forced into the newly formed chamber F. The chamber E is at its maximum volume and accordingly, the inlet port 56 is closed. Exhaust gases are still being driven from chamber C and so exhaust port 60 remains open.

Figure 14:
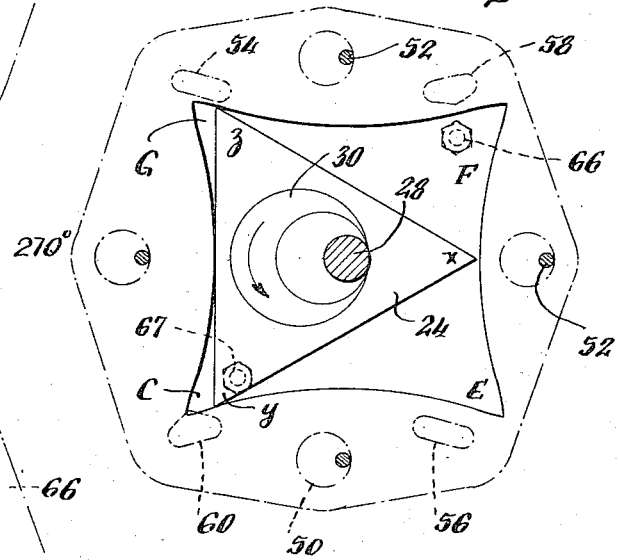

As shown in FIGURE 14, a new chamber G has been formed adjacent inlet port 54. Chamber F is still producing power, and the fuel-air mixture in chamber E is undergoing compression. The chamber C has nearly been eliminated and the exhaust port 60 is now rapidly closing.

Figure 15:
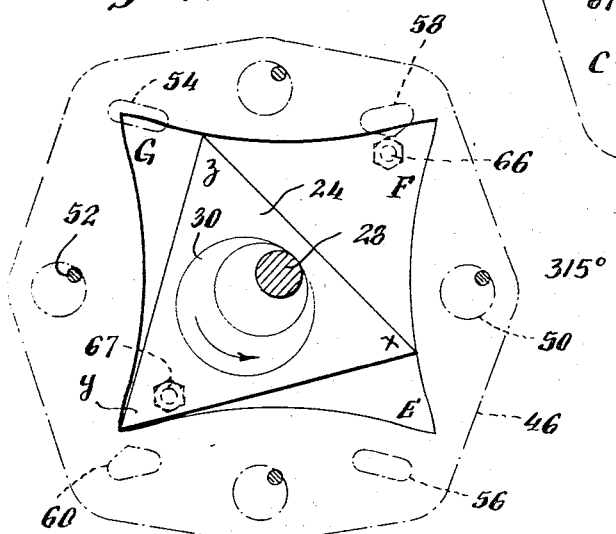

Referring to FIGURE 15, it will be seen that the new chamber G now is receiving the fuel-air mixture through open inlet port 54 while the chamber F passes through maximum volume and exhaust gases begin to be expelled through opening exhaust port 58. Chamber C has been eliminated, exhaust port 60 closed, and the fuel-air mixture in chamber E is nearing maximum compression. As the chamber E is eliminated, the fuel-air mixture will be forced into a newly formed chamber to be exploded as tip Y moves upwardly to uncover the glow plug 67.

As the rotor returns to the FIGURE 8 position with tip Z in the apex position, the power shaft will have been rotated 360°. Thus, for every 360° rotation of the power shaft, the rotor walks around the inner surface of the astroidal outer body through an angle of 120°. For each 360 degree rotation of the power shaft there are two power strokes which contribute greatly to the power output of the engine and to the smooth delivery of such power. The two power strokes provide sufficient torque so that the engine may be used as a direct power source, in some applications.

The invention accordingly comprises the features of construction, combinations of elements, and arrangement of parts which will be exemplified in the construction hereinafter set forth, and the scope of the invention will be indicated in the claims.

It is also to be understood that the following claims are intended to cover all of the generic and specific features of the invention which, as a matter of language, might be said to fall therebetween.

Having described my invention, what I claim as new and desire to secure by Letters Patent is:

1. A rotary mechanism for internal combustion engines, pumps, fluid motors and the like, comprising,
    (A) an outer body having means forming a chamber therein,
        (1) said chamber having parallel inner side walls
            (a) in the shape of a symmetrical astroid in axial cross-section, (b) said astroid having at least four sides,
    (B) a rotor within said chamber having a plurality of outer side walls
        (1) in substantially the shape of a regular polygon in axial cross-section,
        (2) said rotor side walls being one less than the number of said astroidal chamber walls,
    (C) a shaft axially centered within said outer body chamber
        (1) said shaft having eccentric means rotatably engaging said rotor,
    (D) valve means adjacent each of the peaks of said astroid for fluid communication with said chamber,
    (E) and eccentric valve operating means on said shaft,
        (1) said valve means being operable in timed relation to the rotation of said rotor by said eccentric means,
whereby said inner body eccentrically rotates within said outer body with the periphery of said rotor outer side walls closely following said outer body inner side walls to form successive working chambers therebetween.

2. The rotary mechanism defined in claim 1 wherein said rotor is an equilateral triangle in axial cross-section and said chamber is a four sided astroid in axial cross-section, said astroid being generated by a point fixed at a distance from a first circle center of ⅔ the first circle diameter, said first circle diameter being equal to the altitude of said triangular rotor, the generation of said astroid being described by said point as said first circle is rolled around the circumference of a second circle having a diameter ⅘ that of said first circle.

3. In a rotary piston engine having a substantially triangular rotor eccentrically rotatable about the inner chamber of an outer body in the shape of a four sided astroid in cross-section, the combination of:
    (A) a shaft astroidally centered within said inner chamber and driven by the eccentric rotation of said rotor about said inner chamber;
    (B) inlet and exhaust valve means alternately positioned and in opposed peaks of said astroidal inner chamber;
    (C) and valve operating means for opening and closing said inlet and exhaust valves in timed relation to the movement of said rotor,
        (1) said valve operating means including cam means driven by said shaft.

4. In a rotary mechanism for internal combustion engines, pumps, fluid motors and the like, the combination of
    (A) an outer body
        (1) having means forming a cavity with an inner circumference in the shape of a hypotrochoid,
    (B) a rotatable inner body within said outer body,
        (2) having an outer circumference substantially in the shape of a regular polygon,
        (3) said polygon having one less side than the inner surface of said outer body to form working chambers therebetween,
    (C) eccentric means rotatably supporting said inner body within said outer body,
    (D) end walls enclosing said outer body and said inner body
    (E) valve means for the inlet and outlet of fluids to and from said working chambers,
    (F) and second eccentric means for operating said valve means and driven in timed relation to the movement of said inner body within said outer body.

5. The combination defined in claim 4 wherein said inner circumference of said outer body is in the shape of an astroid in axial cross-section.

6. The combination defined in claim 4 wherein said inner body is a rotor in the shape of an equilateral triangle in axial cross-section.

7. The combination defined in claim 6 wherein said astroid is generated by a point fixed at a distance from a first circle center of ⅔ the first circle diameter, said first circle diameter being equal to the altitude of said triangular rotor, the generation of said astroid being described by said point as said first circle is rolled around the circumference of a second circle having a diameter ⅔ that of said first circle.

8. In a rotary mechanism, in combination,
(A) a rotatable shaft
   (1) having first and second annular eccentric members secured thereto,
(B) a triangular rotor
   (1) rotatable about said first eccentric member,
(C) an outer body around said rotor and
   (1) having peripheral walls forming a hypotrochoidal chamber around the inner surface thereof,
   (2) the inner surfaces of said hypotrochoidal chamber being substantially parallel to one another,
   (3) the thickness of said wall being slightly greater than the thickness of said rotor,
(D) a valve plate slidably positioned on said second eccentric,
   (1) and having means forming valve ports therein, and
(E) first and second substantially parallel end walls
   (1) secured to said peripheral wall and
   (2) closely enclosing said rotor and said valve plate,
   (3) said second end wall being adjacent said valve plate (a) and having means forming openings therethrough to said openings in said valve plate.

9. In a rotary engine, in combination,
(A) a rotor in the shape of an equilateral triangle in axial cross-section,
   (1) having means forming an annular axial opening therethrough
(B) an outer body portion around said rotor and
   (1) having an inner surface in the shape of an astroid in axial cross-section,
(C) a valve plate adjacent said rotor,
   (1) having means forming inlet and exhaust ports therethrough,
   (2) said valve plate extending beyond the periphery of the inner surface of said outer body,
   (3) means forming a central annular opening through said valve plate,
(D) a first end wall secured to said outer body portion and abutting said rotor,
(E) a second end wall adjacent said valve plate,
   (1) said second end wall being spaced from said outer body portions to permit sliding motion of said valve plate,
   (2) said second end wall being parallel to said first end wall,
   (3) and having means forming inlet and exhaust openings communicating with said valve plate ports,
(F) a power shaft
   (1) having its longitudinal axis substantially coincident with the center of said outer body,
(G) a first eccentric on said shaft
   (1) rotatably engaging said axial opening of said rotor, and
(H) a second eccentric on said shaft
   (1) adjacent said first eccentric and
   (2) rotatably engaging said central opening of said valve plate,
whereby the periphery of said triangular rotor closely follows the astroidal inner surface of said outer body portion as said rotor rotates about said first eccentric to rotatably drive said shaft and said valve plate is eccentrically moved by said second eccentric to open and close said inlet and exhaust ports in timed relation to the position of said rotor.

10. The rotary engine defined in claim 9 wherein the astroidal shape of the inner surface of said outer body is generated by a point fixed at a distance from a first circle center of ⅔ the first circle diameter, said first circle diameter being equal to the altitude of said triangular rotor, the generation of said astroid being described by said point as said first circle is rolled around the circumference of a second circle having a diameter ⅔ that of said first circle.

11. The rotary engine defined in claim 9 wherein there is means forming a recess in said first end wall and ignition means are positioned in said recess.

12. A rotary piston internal combustion engine, comprising in combination,
(A) a plurality of adjacently connected outer body members,
   (1) each outer body member having means forming a body chamber in the shape of a four sided astroid in axial cross-section,
(B) a rotor in each of said chambers,
   (1) said rotor being substantially in the shape of an equilateral triangle in axial cross-section forming four working chambers in each of said body chambers,
(C) a common drive shaft for all of said rotors,
   (1) said drive shaft having its axis substantially coincident with the center of said outer body chambers,
   (2) eccentric means on said shaft for driving engagement with each of said rotors,
(D) intake and exhaust valve means for the working chambers of each of said body chambers, and
(E) cam means on said shaft for opearting said valve means in timed relation with the rotation of said shaft.

13. A rotary piston engine as defined in claim 12 wherein there are provided three outer body members having three counterbalanced rotors driving said common drive shaft.

14. A rotary piston engine as defined in claim 12 wherein said valve means comprises two intake valves and two exhaust valves for each outer body chamber, said valves having means forming openings in said working chambers of each said outer body chamber, said inlet and outlet valve openings being alternated around said working chambers.

References Cited
UNITED STATES PATENTS

| | | | |
|---|---|---|---|
| Re. 25,126 | 2/1962 | Charlson | 91—56 |
| Re. 25,291 | 12/1962 | Charlson | 91—56 |
| 1,389,189 | 8/1921 | Feuerheerd | 103—130 |
| 2,162,771 | 6/1939 | Winans | 91—56 |
| 2,994,277 | 8/1961 | Merritt | 123—8 |
| 3,062,435 | 11/1962 | Bentele | 123—8 |
| 3,131,678 | 5/1964 | Peras | 123—8 |
| 3,224,421 | 12/1965 | Paras | 230—145 |

DONLEY J. STOCKING, *Primary Examiner.*

WILBUR J. GOODLIN, *Examiner.*